(12) United States Patent
Ozaki

(10) Patent No.: US 6,697,977 B2
(45) Date of Patent: Feb. 24, 2004

(54) DISC RECORDING APPARATUS, METHOD FOR REPLACING SECTOR ON RECORDING DISC, AND RECORDING DISC

(75) Inventor: Koji Ozaki, Hyogo (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/267,570

(22) Filed: Oct. 9, 2002

(65) Prior Publication Data

US 2003/0031106 A1 Feb. 13, 2003

Related U.S. Application Data (63) Continuation of application No. PCT/JP00/04917, filed on Jul. 21, 2000.

(51) Int. Cl.[7] .............................................. G11C 29/00
(52) U.S. Cl. ........................ 714/710; 714/2; 369/53.17; 360/53
(58) Field of Search ........................ 369/53.17; 360/53; 714/2, 710

(56) References Cited

U.S. PATENT DOCUMENTS

| | | | | |
|---|---|---|---|---|
| 6,233,108 B1 | * | 5/2001 | Inoue | 360/53 |
| 6,393,580 B1 | * | 5/2002 | Harada | 714/2 |

FOREIGN PATENT DOCUMENTS

| | | |
|---|---|---|
| JP | 60-129976 | 7/1985 |
| JP | 63-288468 | 11/1988 |
| JP | 64-004979 | 1/1989 |
| JP | 01-220265 | 9/1989 |
| JP | 01-296357 | 11/1989 |
| JP | 11-306695 | 11/1999 |
| JP | 2000-048496 | 2/2000 |

* cited by examiner

*Primary Examiner*—Aristotelis M. Psitos
(74) *Attorney, Agent, or Firm*—Greer, Burns & Crain, Ltd.

(57) ABSTRACT

A disc recording apparatus (A) for writing data onto a sector providing a recording area (B2) on a magneto-optical disc (B) performs a retry upon failure in the writing until a predetermined number of retries is reached, treats the sector as a defective sector upon failure in the last retry of the predetermined number of retries, and writes the data onto another sector. During a physical formatting, A CPU (11) records in medium management information (B1) on the recording disc (B) a retry count as retry count information for each of recovered sectors recovered from the failure through success in the writing of data during the retry. When actual data is written onto the physically formatted magneto-optical disc (B), and upon detection of a defective sector failed in the writing of the actual data, the CPU (11) selects a replacement sector for the defective sector. The replacement sector has a retry count stored as the retry count information smaller than that of the defective sector.

6 Claims, 12 Drawing Sheets

DISC RECORDING APPARATUS, METHOD FOR REPLACING SECTOR ON RECORDING DISC, AND RECORDING DISC

REFERENCE TO THE RELATED APPLICATION

This application is a continuation of International Application PCT/JP00/04917 filed Jul. 21, 2000.

TECHNICAL FIELD

The present invention relates to a disc recording apparatus for recording data onto e.g. a magneto-optical disc while detecting defective sectors. The present invention also relates to a method for the apparatus to replace a sector on the recording disc. The present invention further relates to the recording disc.

BACKGROUND ART

Due to increased capacity, magneto-optical discs in recent years have an increasingly narrow track pitch. This has increased probability of error occurrence when writing data on the magneto-optical disc. At the time of data writing error, a retry is made as many times as predetermined. If the data writing is not successful within the predetermined number of retries, a decision is made finally that the writing has failed. A recent tendency is that the number of retries (retry count) is also increasing. This means that a long time is spent in vain for retries, resulting in prolonged access time. Consequently, there is a need for a technique to reduce the access time.

Figure 11:
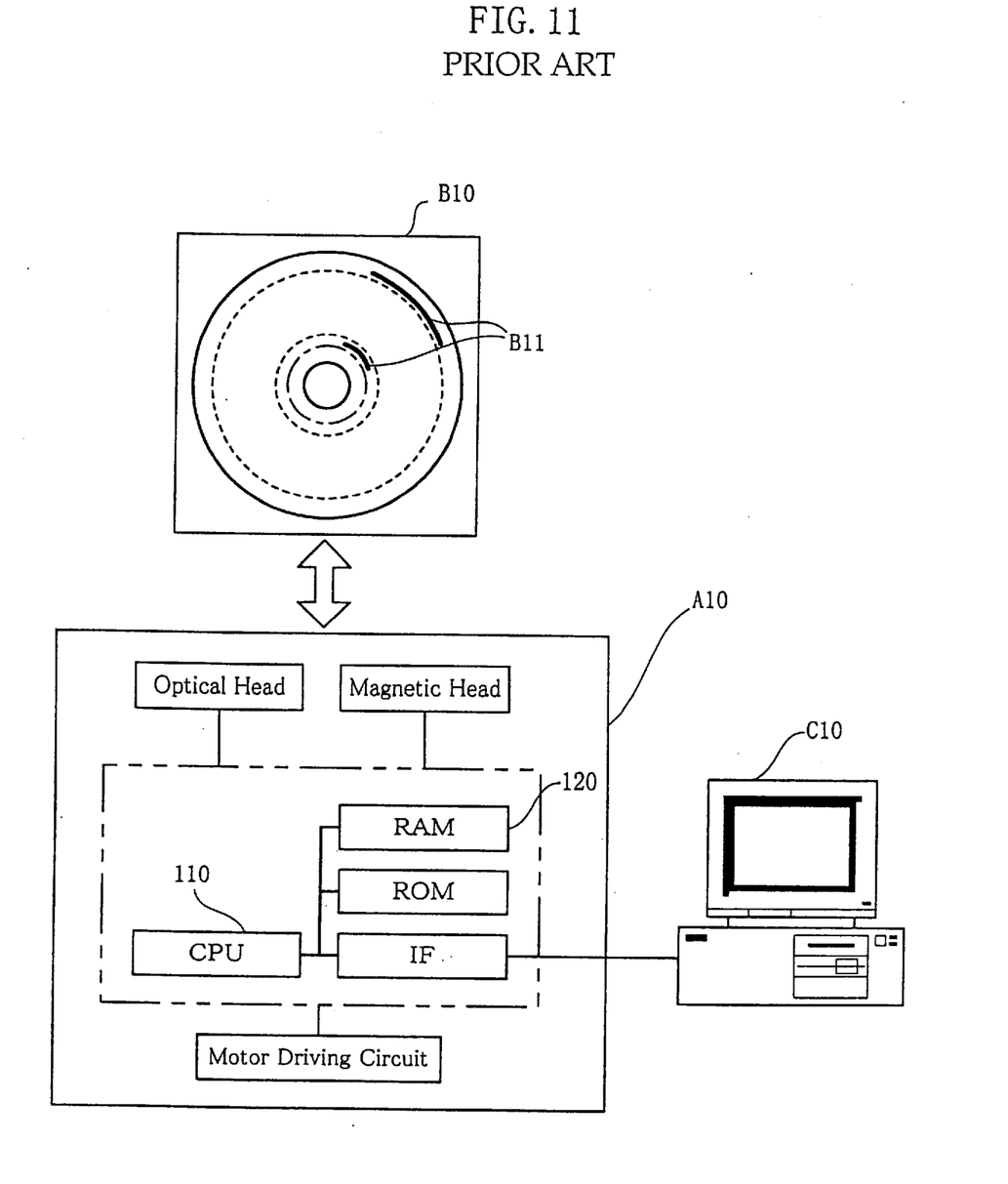
FIG. 11 is a block diagram of a conventional recorder/player.

As shown in FIG. 11, a conventional recorder/player A10 formats a magneto-optical disc B10 in response to a command from a host personal computer C10. During the formatting, a CPU 110 of the recorder/player A10 writes initializing data onto each sector that provides a unit recording-area on the magneto-optical disc B10.

During this formatting, when there is a failure in writing the initializing data in one of the sectors, the CPU 110 makes a retry until the predetermined number of retries is reached. If the writing is not successful within the predetermined number of retries, the CPU 110 stores the address of the failed sector in a RAM 120 in the form of PDL (Primary Defect List). At the end of the formatting, the PDL is recorded as part of medium management information B11 on the magneto-optical disc B10.

On the other hand, the sectors onto which the initializing data was successfully recorded within the predetermined number of retries do not have their addresses listed in the PDL, and are allowed for use as flawless sectors. Such a formatting procedure is executed to all the sectors which are to be formatted.

Figure 12:
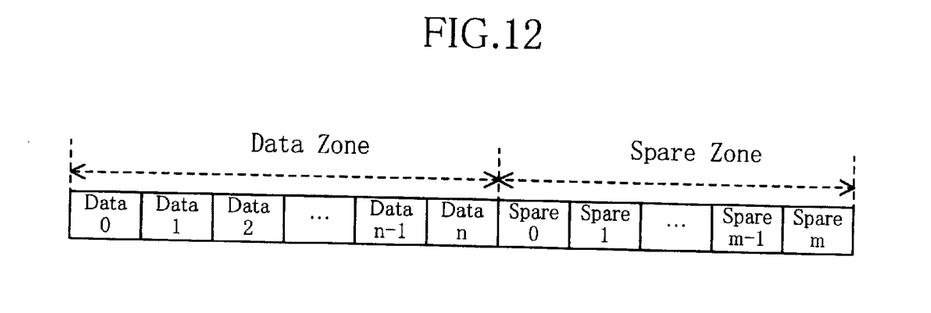
FIG. 12 is a diagram illustrating a zone without defect.
Figure 13:
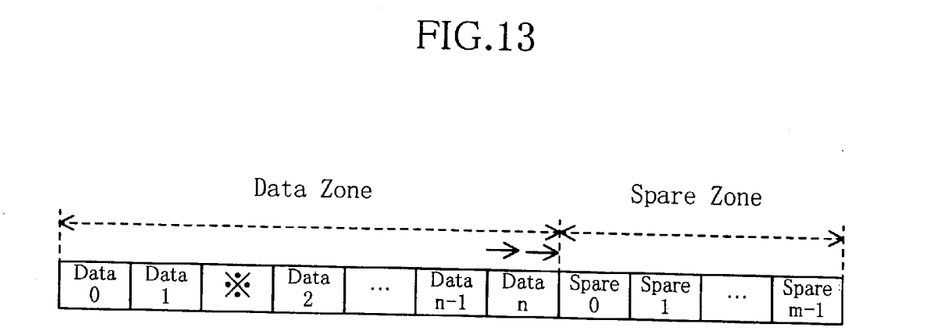
FIG. 13 is a diagram for describing PDL and a primary defect.

Now, description will be given more about the PDL. FIG. 12 shows a zone without any defective sectors. Now, compare FIG. 12 to FIG. 13: When a defective sector is found in a data zone while formatting a magneto-optical disc B10, the defective sector is skipped, and the initializing data is written onto the next sector. In this way, the data zone including the defective sector is extended into a spare zone in order to provide a predetermined number of flawless sectors by using a spare sector(s) available in the spare zone. The address of the defective sector is stored in the RAM 120. Such a defect, i.e. a defect in which address can be assigned while skipping a defective sector, is called primary defect. A set of addresses of the defective sectors that fall into the category of the primary defect is called PDL.

Now the formatting is over. When actual data is written onto this magneto-optical disc B10, the CPU 110 of the recorder/player A10 writes the actual data onto a sector specified by an address in response to a "write" command from the personal computer C10.

When the writing of the actual data is not successful, the CPU 110 makes a retry until a predetermined number of retries is reached. If the writing of the actual data is still not successful within the predetermined number of retries, the CPU 110 recognizes this sector that does not accept the actual data, as a defective sector, and then performs a replacement procedure in which the actual data is written onto another sector.

Specifically, during the replacement procedure, the CPU 110 searches a spare zone which immediately follows the data zone including the defective sector, selects an unused spare sector closest to the defective sector, as a replacement sector, and writes the actual data onto the replacement sector.

If the replacement sector does not allow writing, the CPU 110 makes a retry, seeking for another replacement sector. If the writing of the actual data is not successful within a predetermined number of retries, then another cycle of the replacement procedure is performed.

Such a replacement procedure performed within the spare zone is called re-replacement procedure, in which the cycle of seeking a replacement spare is repeated until the actual data is successfully written so long as a predetermined number of retries is not yet been reached.

When the actual data has been successfully written within the predetermined number of retries, the CPU 110 records addresses of the defective sectors that did not allow writing of the actual data, in the form of SDL (Secondary Defect List) in the medium management information B11 of the magneto-optical disc B10, and then reports to the personal computer C10 the successful completion. When the actual data has not been successfully written within the predetermined number of retries, the CPU 110 reports a disc error to the personal computer C10.

Figure 14:
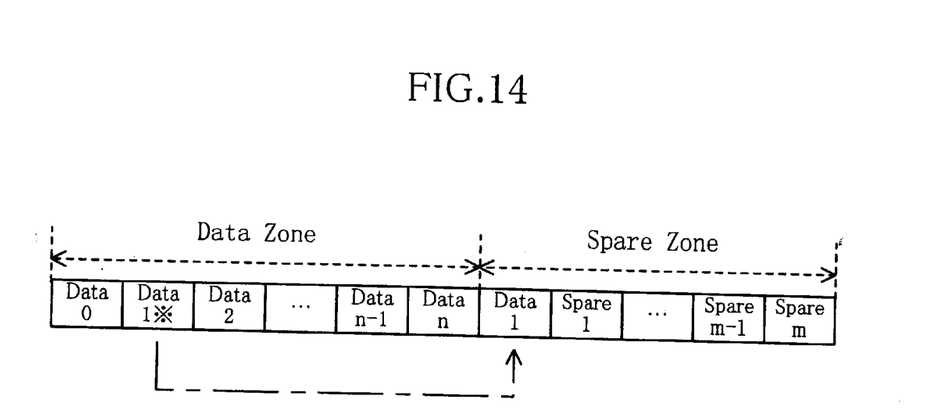
FIG. 14 is a diagram for describing SDL and a secondary defect.

Now, description will be given more about the SDL. FIG. 12 shows a zone without any defective sectors. Now, compare FIG. 12 to FIG. 14: When a defective sector is found while writing actual data, the actual data is written in a sector in the spare zone, in place of the defective sector. Then, the address of the defective sector which was replaced and the address of the spare sector which replaced are recorded onto the medium management information B11. Such a defect, i.e. a defect in which a replacing spare sector can be specified by address conversion, is called secondary defect. A set of addresses of the defective sectors that fall into the category of the secondary defect is called SDL.

With the above, the CPU 110 performs the replacement procedure when a defective sector is found while writing actual data based on an address specified by the host personal computer C10. However, there is no guarantee that the writing will be successfully completed in the replacing sector. Sometimes, the replacing sector has a higher error probability than the replaced sector which was found defective. Thus, there have been cases in which the replacement procedure was repeated in vain to such a replacing sector, before the re-replacement procedure was finally inaugurated.

As understood, execution of the re-replacement procedure means that the replacement procedure is repeated twice or even more times in order to write actual data onto one sector, that a huge number of retries must be made for the writing of actual data, and as a result, that a long time is needed for the writing of actual data including the time spent for the replacement procedures. This creates a delay in response to the "write" command from the personal computer C10, leading to a "timeout" error in the personal computer C10.

DISCLOSURE OF THE INVENTION

It is therefore an object of the present invention to provide a disc recording apparatus, a method for replacing sector on a recording disc and the recording disc, capable of reducing the access time without spending as much time when data writing is not successful.

A first aspect of the present invention provides a disc recording apparatus for writing data onto a sector providing a recording area on a recording disc. Upon failure in the writing, the apparatus performs a retry until a predetermined number of retries is reached, treats the sector as a defective sector upon failure in the last retry of the predetermined number of retries, and writes the data onto another sector. The apparatus comprises: a recording section recording onto the recording disc a retry count as retry count information for each of recovered sectors recovered from the failure through success in the writing of data during the retry; and a sector replacing section selecting a replacement sector for the defective sector detected upon the failure in the writing onto the recording disc containing the retry count information recorded by the recording section. The replacement sector has a retry count stored as the retry count information smaller than that of the defective sector.

A second aspect of the present invention provides a disc recording apparatus for writing data onto a sector providing a recording area on a recording disc. Upon failure in the writing, the apparatus performs a retry until a predetermined number of retries is reached, treats the sector as a defective sector upon failure in the last retry of the predetermined number of retries, and writes the data to another sector. The apparatus comprises: a storing section storing a retry count as retry count information for each of recovered sectors recovered from the failure through success in the writing of data during the retry; and a sector replacing section selecting a replacement sector for the defective sector detected upon the failure in the writing onto the recording disc for which the retry count information is stored by the storing section. The replacement sector has a retry count stored as the retry count information smaller than that of the defective sector.

According to a preferred embodiment, the sector replacing section registers a sector as a defective sector onto the recording disc if the sector is found to have a retry count stored as the retry count information larger than that of the defective sector during the process of selecting the replacement sector.

A third aspect of the present invention provides a method for replacing a sector for writing data onto a sector providing a recording area on a recording disc. Upon failure in the writing, the method performs a retry until a predetermined number of retries is reached, treats the sector as a defective sector upon failure in the last retry of the predetermined number of retries, and writes the data onto another sector. The method comprises: a step of recording onto the recording disc a retry count as retry count information for each of recovered sectors recovered from the failure through success in the writing of data during the retry; and a step of sector replacing control for selecting a replacement sector for the defective sector detected upon the failure in the writing onto the recording disc containing the retry count information recorded by the recording section. The replacement sector has a retry count stored as the retry count information smaller than that of the defective sector.

A fourth aspect of the present invention provides a method for replacing a sector for writing data onto a sector providing a recording area on a recording disc. Upon failure in the writing, the method performs a retry until a predetermined number of retries is reached, treats the sector as a defective sector upon failure in the last retry of the predetermined number of retries, and writes the data to another sector. The method comprises: a step of storing a retry count as retry count information for each of recovered sectors recovered from the failure through success in the writing of data during the retry; and a step of sector replacement control for selecting a replacement sector for the defective sector detected upon the failure in the writing onto the recording disc for which the retry count information is stored by the storing section. The replacement sector has a retry count stored as the retry count information smaller than that of the defective sector.

A fifth aspect of the present invention provides a recording disc for recording data written onto a sector providing are cording area. Upon failure in the writing, a retry is performed until a predetermined number of retries is reached. Upon failure in the last retry of the predetermined number of retries, the sector is treated as a defective sector, and the data is written onto another sector. A retry count is recorded as retry count information for each of recovered sectors recovered from the failure through success in the writing of data during the retry.

According to the present invention, when data is written onto a recording disc that includes restored sectors restored through retries after having failed to accept data at least one time, and if there is a failure in writing data onto a sector, a replacement sector is selected which will not require as many retries as needed for the restored sectors for the writing of the data.

In other words, the restored sectors, i.e. sectors which are made usable through the retry are given low priority for serving as a replacement sector because of a high risk of failure in data writing. Thus, it is possible to select a sector to which the data writing will be successful at the first attempt, without requiring any retries for example. Therefore, even if there is a failure in data writing onto a sector, there is a high probability of success in the replacement sector, and the number of retries and the time necessary for the retry procedures are held minimum, making possible to decrease the access time.

Other objects, characteristics, and advantages of the present invention will become clearer from the following description of embodiments to be presented with reference to the accompanying drawings.

BEST MODE FOR CARRYING OUT THE INVENTION

Hereinafter, a first embodiment of the present invention will be described with reference to FIG. 1 through FIG. 4.

Figure 1:
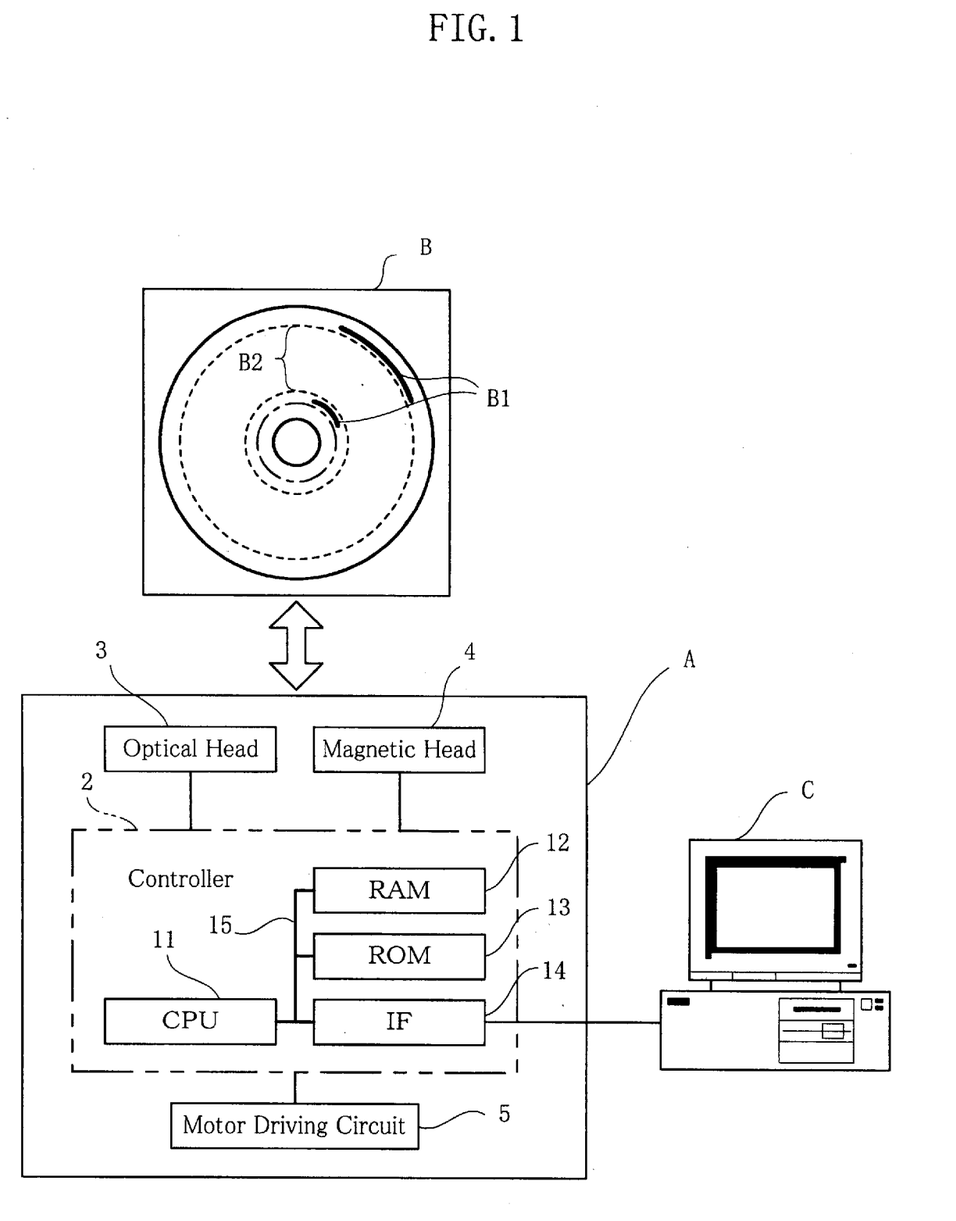
FIG. 1 is a block diagram of a recorder/player including a disc recording apparatus according to the present invention.

As shown in FIG. 1, the first embodiment of the present invention uses, a recorder/player A as the disc recording apparatus, a magneto-optical disc B as the recording disc and a personal computer C as a host which directs reading and writing of data. As a matter of fact, the recorder/player A not only can record data and information onto the magneto-optical disc B but also can read the recorded data and information therefrom. The personal computer C, operating on the basis of an OS (Operating System) which provides file managing capabilities, does not have any new essential characteristics, and therefore will not be described or illustrated in specific details.

First, description will be made for the magneto-optical disc B. The magneto-optical disc B is provided by e.g. MO discs, of different capacities such as 230 MB, 540 MB, 640 MB, and 1.3 GB. The magneto-optical disc B has a multiple of tracks (not illustrated) each serving as a recording area B2 for storing data. Conceptually, the magneto-optical disc B has a number of sectors each made up of the tracks and serving as a unit recording area. Generally, in a 640 MB magneto-optical disc for example, the recording area is physically formatted into eleven zones from radially inward through outward side. In a 1.3 GB magneto-optical disc, the recording area is divided into eighteen zones from radially outward through inward side. The zones include data zones and spare zones to be described later. In practical application, the tracks are often helical.

The magneto-optical disc B has more areas in its recording surface. Specifically, there are a couple of areas, one being more outward and the other being more inward of the recording area B2. These extra areas are used for storing medium management information B1. The medium management information B1 includes PDL and SDL described earlier, or lists of defective sectors on the recording area B2 of the magneto-optical disc B. Further, the medium management information B1 includes information on the number of retries to be described later.

As shown in FIG. 1, the recorder/player A includes a controller 2, an optical head 3, a magnetic head 4, and a motor driving circuit 5. The controller 2 includes a CPU 11, a RAM 12, a ROM 13 and an interface circuit 14. These CPU 11, RAM 12, ROM 13 and the interface circuit 14 are interconnected via a bus line 15. The bus line 15 includes a data bus, an address bus and a control signal bus.

The recorder/player A performs physical formatting of the magneto-optical disc B as well as writing and reading of data and information under various commands from the personal computer C. During the physical formatting, an initializing data is written onto each of the sectors in the data zones and the spare zones on the magneto-optical disc B. During the physical formatting, defective sectors fallen into the primary defect category, or those which does not allow the writing of initializing data, can be detected from the data zones. The address of each defective sector can be recorded in the PDL stored in the medium management information B1. On the other hand, those sectors which once rejected but finally allowed the writing of initializing data during a retry (retry procedure) to be described later are recognized as restored sectors. The address of each restored sector and the number of retries (retry count) which was necessary for the restoration are recorded as retry count information in the medium management information B1.

When actual data is written onto a formatted magneto-optical disc B, defective sectors fallen into the secondary defect category, or those which does not allow the writing of the actual data, can be detected and the address of each defective sector is recorded in the SDL stored in the medium management information B1. During this step, a defective sector fallen into the secondary defect category is replaced by a spare sector included in a spare zone following the data zone that includes the defective sector. Thus, the spare sector can be used as a replacement sector for the writing of actual data. If the replacement spare sector is found to be defective, another spare sector is sought to be the replacement. These patterns of operation in cases where primary and/or secondary defects exist will be detailed later.

The controller 2 controls the optical head 3, the magnetic head 3, and the motor driving circuit 4 under the direction from the personal computer C. The optical head 3 and the magnetic head 4 make access to the unit recording areas (sectors) of the magneto-optical disc, under the control provided by the controller 2. The motor driving circuit 5, controlled by the controller 2, drives a motor for turning the magneto-optical disc B and motors for moving the optical head 3 and magnetic head 4.

The CPU 11 provides control over the entire controller 2. The RAM 12 provides the CPU 11 with a work area for storing various data and information. The ROM 13 stores programs and data for the CPU 11 to operate.

Figure 2:
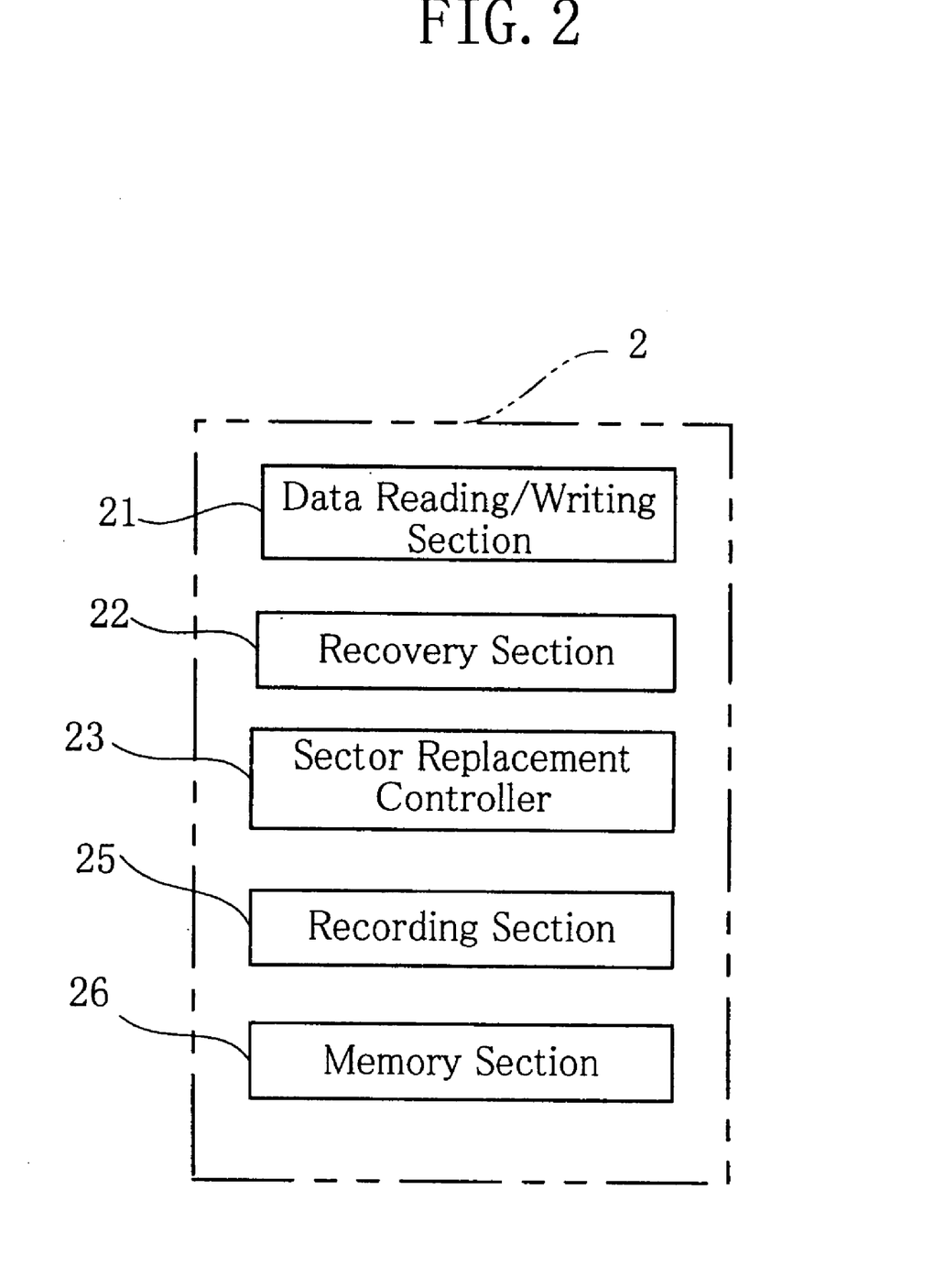
FIG. 2 is a functional block diagram of the recorder/player according to the first embodiment offered by the present invention.

The controller 2 can be illustrated as in a functional diagram in FIG. 2, and includes a data reading/writing section 21, a recovery section 22, a sector replacement controller 23, a recording section 25, and a memory section 26. Specifically, the CPU 11 provides the data reading/writing section 21, the recovery section 22, the sector replacement controller 23, and the recording section 25. The RAM 12 provides the memory section 26.

The data reading/writing section 21 performs reading and writing of data and information to and from the magneto-optical disc B while making reference to the medium management information B1 thereby converting addresses.

The recovery section 22 performs a retry to a sector when the data reading/writing section 21 fails to write initializing data or actual data onto the sector. Such a retry regarding the data writing is made till successful within a predetermined number of retries. If the data writing is not successful within the predetermined number, such a sector is detected as a defective sector. This retry will be called "retry procedure" hereinafter.

The sector replacement controller 23 seeks a replacement sector. Specifically, during the writing of actual data to a sector, when the recovery section 22 has finally failed to write within the predetermined number of retries and the sector has been detected as defective, another sector is sought for the writing. More specifically, the sector replacement controller 23 selects a sector, in the given spare zone, having a smaller retry count than a retry count recorded for the defective sector in the retry count record to be detailed later. In other words, when a defective sector of the secondary defect category is found during actual-data writing, a replacement sector to be selected is a sector which was formatted in a smaller number of retries than was the defective sector. It should be noted here that those sectors which are formatted successfully without performing the retry procedure are treated as having a retry count of zero. If the replacement sector thus selected fails to allow the data writing and therefore is found to be defective, the sector replacement controller 23 selects another sector as a replacement sector, from the given spare zone. In the above description, the first cycle of procedure for seeking a replacement sector will be called replacement procedure, whereas the second cycle and thereafter will be called re-replacement procedure. An upper limit is set for the number of re-replacement procedures to be made, and if data is not written successfully within the limited number of retries, the sector replacement controller 23 finally declares a disc error.

The recording section 25 is called up when the recovery section 22 executing the retry procedure succeeds in recovering a sector by succeeding in the writing of initializing data within the predetermined number of retries during the physical formatting. The recording section then records a retry count, i.e. the number of retries which was necessary for recovering the sector, as the retry count information in the medium management information B1 on the magneto-optical disc B. Further, the recording section 25 records PDL and SDL in the medium management information B1.

The memory section 26 stores the PDL, the SDL and the retry count information. These PDL, SDL and retry count information will finally be copied in the medium management information B1 of the magneto-optical disc B.

Next, an operation performed for physically formatting a magneto-optical disc will be described with reference to a flowchart in FIG. 3. Also, an operation performed for writing actual data onto the magneto-optical disc will be described with reference to a flowchart in FIG. 4.

Figure 3:
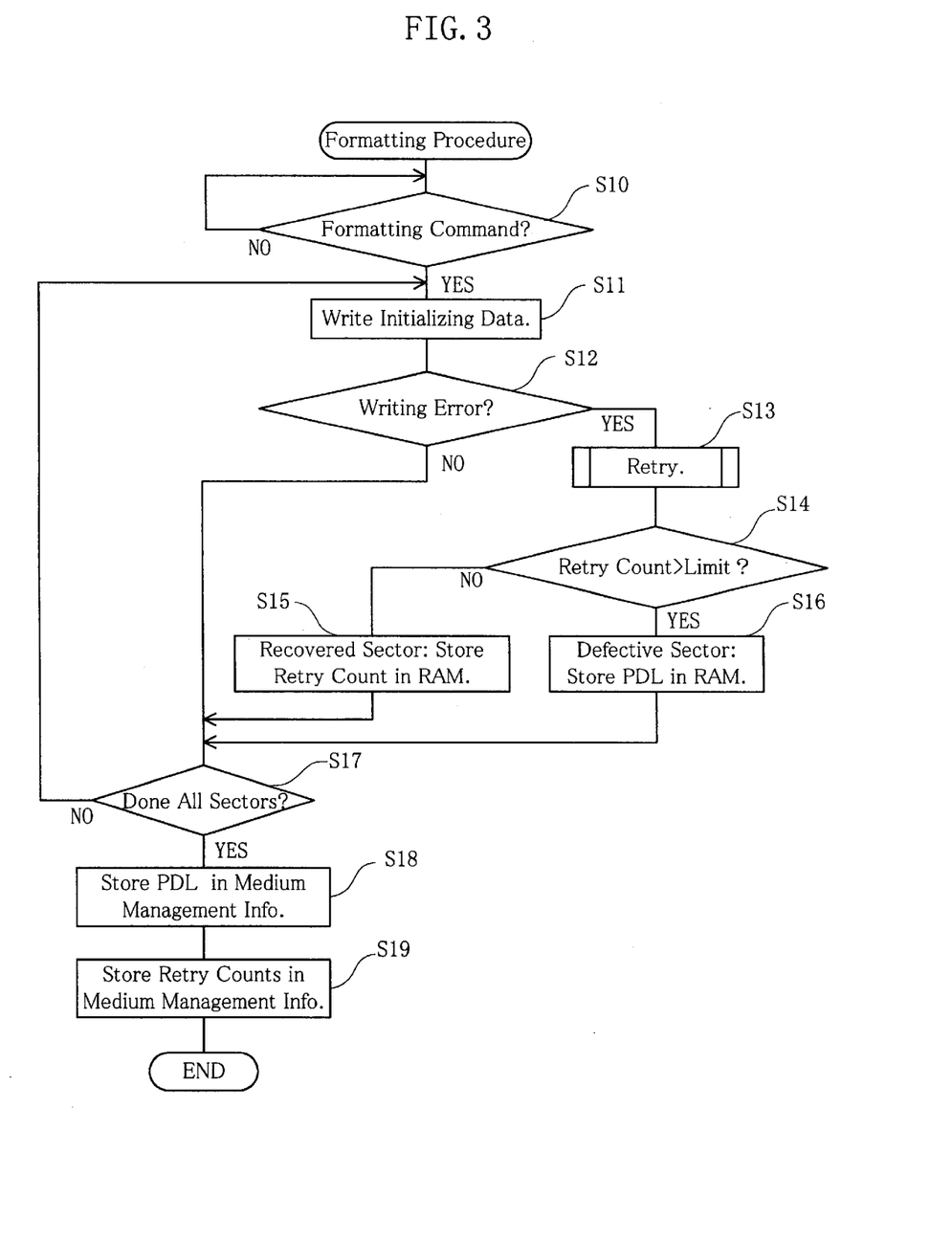
FIG. 3 is a flowchart showing a formatting procedure according to the first embodiment.

First, as shown in FIG. 3, a personal computer C issues a command which requests the physical formatting (S10: YES). Then, the CPU 11 of the recorder/player A performs the physical formatting (S11) by writing initial formatting data onto each sector on a magneto-optical disc B. The physical formatting is performed both the data zones and the spare zones.

During this physical formatting, when the process encounters a writing error (S12: YES), i.e. when the writing of the initializing data onto a certain sector is impossible, the CPU 11 executes the retry procedure to this sector (S13).

When the retry procedure is successful within a predetermined number of retries (S14: NO), the CPU 11 detects this sector that has undergone the retry procedure as a recovered sector, and stores the address and the retry count of the sector in the RAM 12 (S15). The restored sector thus detected is not recorded as a defective sector, and allowed for use. However, the sector may fail later and be determined as a defective sector during actual-data writing to be described later. It should be noted here that restored sectors can be detected not only from the data zones but also from the spare zones. Further, the predetermined number set as the retry count upper limit can be different for each sector. Alternatively, the limit value may be a fixed value selected for each sector or may be variable.

On the other hand, when the retry count exceeds the predetermined limit (S14: YES), the CPU 11 determines that the sector in process of the retry procedure is a defective sector of the primary defect category, and then stores the address of the defective sector in the form of PDL in the RAM 12 (S16). If the defective sector is found in the data zone, the CPU 11 expands this data zone into the relevant spare zone, thereby making available a number of sectors necessary for the normal data zone.

Thereafter, the CPU 11 checks if the initial-data writing has been completed for all of the sectors (S17). When the writing has been complete for all of the sectors (S17: YES), the CPU 11 copies the PDL stored in the RAM 12 in the step S16 into the medium management information B1 on the magneto-optical disc B (S18).

Further, the CPU 11 copies the retry count stored for each restored sector in the step S15 in RAM 12 onto the medium management information B1 on the magneto-optical disc B (S19) as the retry count information, before finishing the physical formatting procedure.

In step S17, if it is found that the writing of initial data is not yet completed for all of the sectors (S17: NO), the CPU 11 executes step S11 to perform the initial-data writing for the rest of the sectors.

In step S12, when the initial-data writing is successfully completed at the first time for a sector (S12: NO), then the CPU 11 proceeds to step S17.

In step S10, when no physical formatting command is found from the personal computer C (S10: NO), the CPU 11 waits for the formatting command from the personal computer C.

Now the physical formatting is over. Then, when actual data is written onto the magneto-optical disc B, the writing operation is controlled in accordance with a flowchart shown in FIG. 4.

Figure 4:
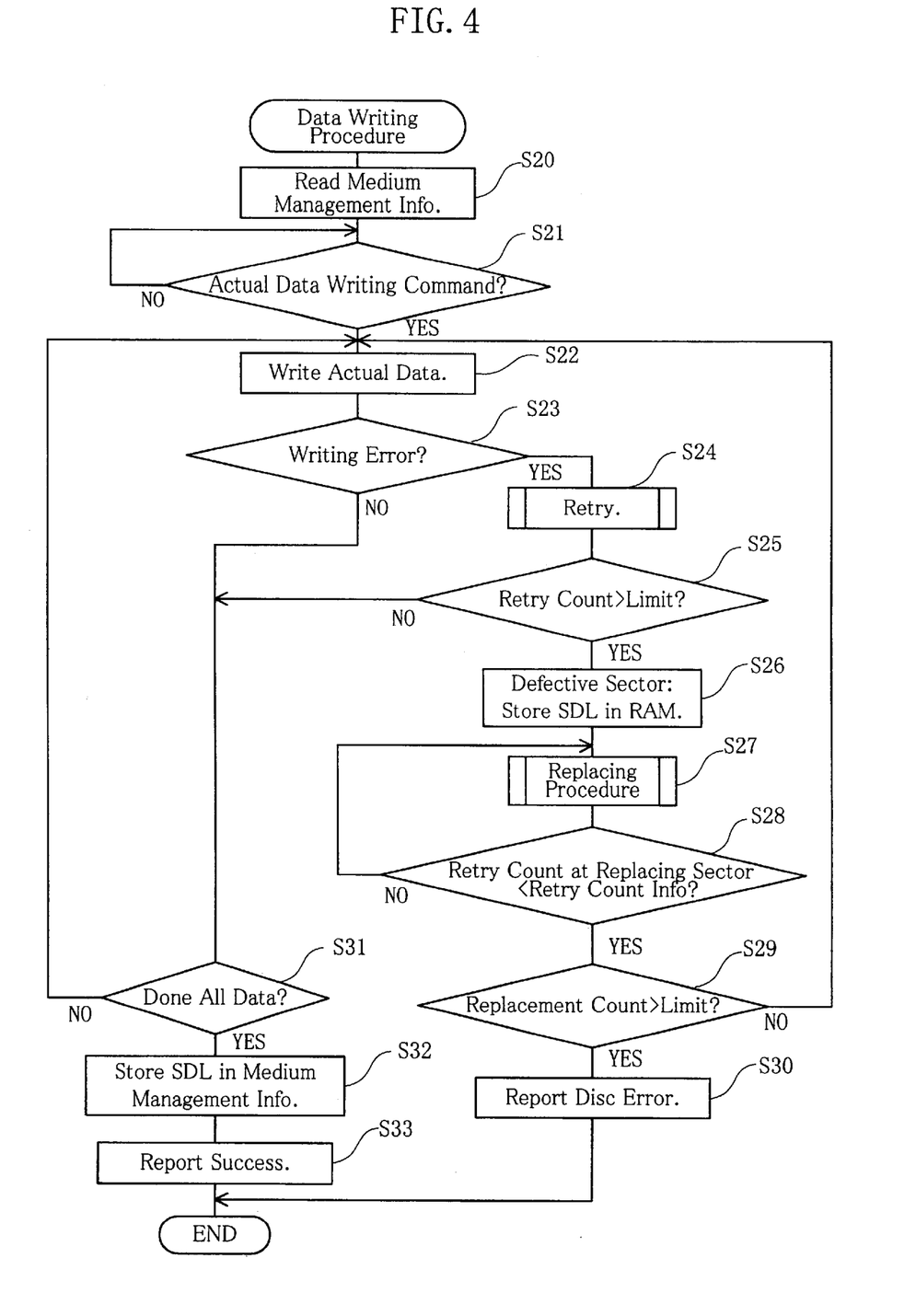
FIG. 4 is a flowchart showing a data writing procedure according to the first embodiment.

First, the CPU 11 reads medium management information B1 from the magneto-optical disc B (S20). Specifically, the CPU 11 copies the PDL and the retry count information contained in the medium management information B1 into the RAM 12.

When the process finds a command form the personal computer C which, accompanied by an address assigned, requests the writing of actual data (S21: YES), the CPU 11 performs the writing of actual data onto a formatted valid sector(s), making reference to the PDL thereby converting addresses (S22). The valid sectors include restored sectors.

When there happens a writing error during the writing of actual data (S23), the CPU 11 makes retries, similarly as in S13, to the failed sector (S24).

When the retry procedure is successful before a predetermined number of retries is reached (S25: NO), the CPU 11 proceeds to step S31 to be described later. However, when the predetermined number of retries will be exceeded (S25: YES), the CPU 11 determines that this sector to which the retry procedure has been tried is a defective sector of the secondary defect category, and then stores the address of the defective sector in the form of SDL in the RAM 12 (S26).

Then, the CPU 11 performs the replacement procedure (S27), searching the spare zone for a sector which can replace the defective sector (S27). Note that when the replacement procedure executed in step S27 is executed again later, it is called re-replacement procedure.

During the replacement procedure, the CPU 11 searches the spare zone that immediately follows the data zone including the defective sector, and selects a sector closest to the defective sector, i.e. closest to the head of the row, as a replacement sector. During this step, the CPU 11 makes reference to the retry information, and thereby checks if the replacement sector will allow the writing in a fewer number of retries than the number of retries recorded for the defective sector (S28). In other words, the CPU 11 avoids selecting, as the replacement sector, a restored sector which has undergone the retry procedure during the physical formatting and therefore has a high risk of being defective. According to such an operation, there is no chance that the replacement procedure selects a replacement sector which has a higher probability of being defective than does the defective sector for which replacement sector is sought.

When the determination is made that the candidate for the replacement sector will allow the writing within a fewer number of retries found in the retry count information than the number of retries recorded for the defective sector (S28: YES), the CPU 11 brings the process back to step S22 as far as the actual retry count does not exceed the upper limit number (S29: NO), trying to write actual data onto the replacement sector. It should be noted here that there can be a case where the defective sector has a retry count value of zero recorded in the retry count information. This case may be treated as an exception, in which a sector which has a retry value of zero is selected for the actual-data writing, or the case may be determined as a disc error as will be described later.

On the other hand, when the retry count exceeds the predetermined limit (S29: YES), the CPU 11 determines that a disc error has occurred which makes unable to write actual data, reports the situation to the personal computer C (S30), and ceases the actual-data writing procedure.

In step S28, when the checking reveals that the number of expected retries to be made to the candidate for the replacement sector is not smaller than the number of retries recorded for the defective sector found in the retry count information (S28: NO), the CPU 11 brings the process back to step S27, trying to find another candidate for the replacement sector. In other words, the CPU 11 performs a re-replacement procedure when it determines that the selected candidates will require more retries than needed for the defective sector.

In step S25, if the retry procedure is successful within the predetermined number of retries (S25: NO), then the CPU 11 checks if the writing procedure has been complete for all the actual data specified by the personal computer C for the writing (S31).

When the writing procedure has been complete for all of the actual data (S31: YES), then the CPU 11 copies the SDL stored in step S26 in the RAM 12, onto the medium management information B1 of the magneto-optical disc B (S32). In this step, when there is an existing SDL in the medium management information B1, a new SDL will be added.

Further, the CPU 11 reports to the personal computer C about a successful completion of the writing of actual data (S33), and then finally finishes the actual-data writing procedure.

In step S31, when the writing procedure has not been complete for all of the actual data (S31: NO), then the CPU 11 brings the process back to step S22 to perform the actual-data writing for the rest of the actual data.

In step S23, when the writing of actual data is successful at the first time for a sector (S23: NO), the CPU 11 proceeds to S31.

In step S21, when there is no command from the personal computer C which requests writing of actual data (S21: NO), the CPU 11 waits until a data writing command comes from the personal computer C.

Therefore, according to the first embodiment, a restored sector which has failed to accept data at least one time during the physical formatting is not used as a replacement sector because of its high risk of failure in actual-data writing. Thus, it is possible to write actual data onto clean sectors that are not restored sectors. In other words, probability for the retry procedure to be repeated to a replacement sector is now lower than in the convention. Since the number of retries and the time necessary for the retry procedures are held minimum, it is possible to decrease the access time in the writing of actual data.

Next, a second embodiment will be described with reference to FIG. 1, FIG. 5 and FIG. 6. Note that flowcharts given in FIG. 5 and FIG. 6 contain same steps as in FIG. 3 or FIG. 4. These steps will be identified by the same step numbers and not be described again.

Figure 5:
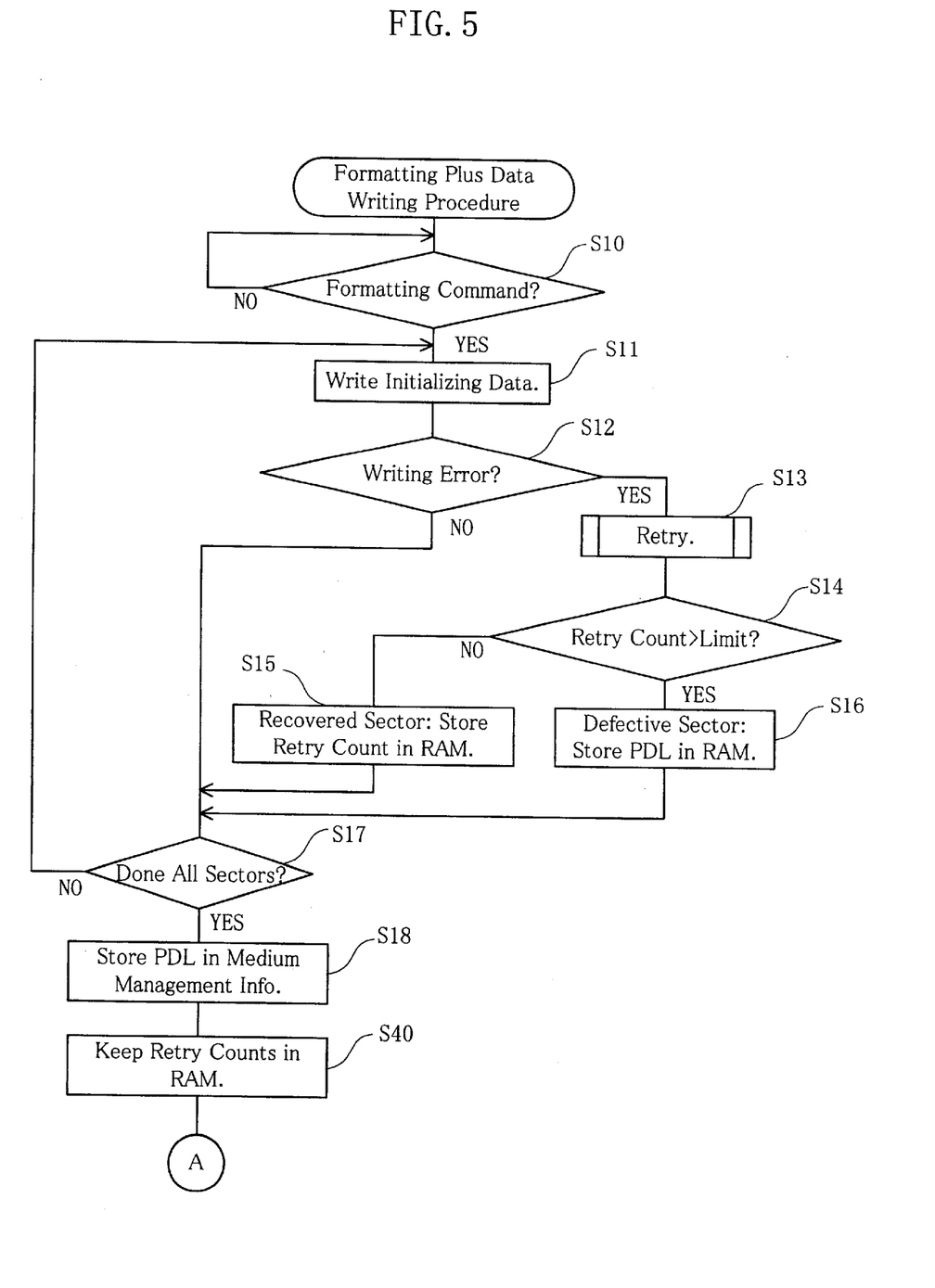
FIG. 5 is a flowchart according to a second embodiment, showing a case in which a formatting procedure is followed by a data writing procedure.
Figure 6:
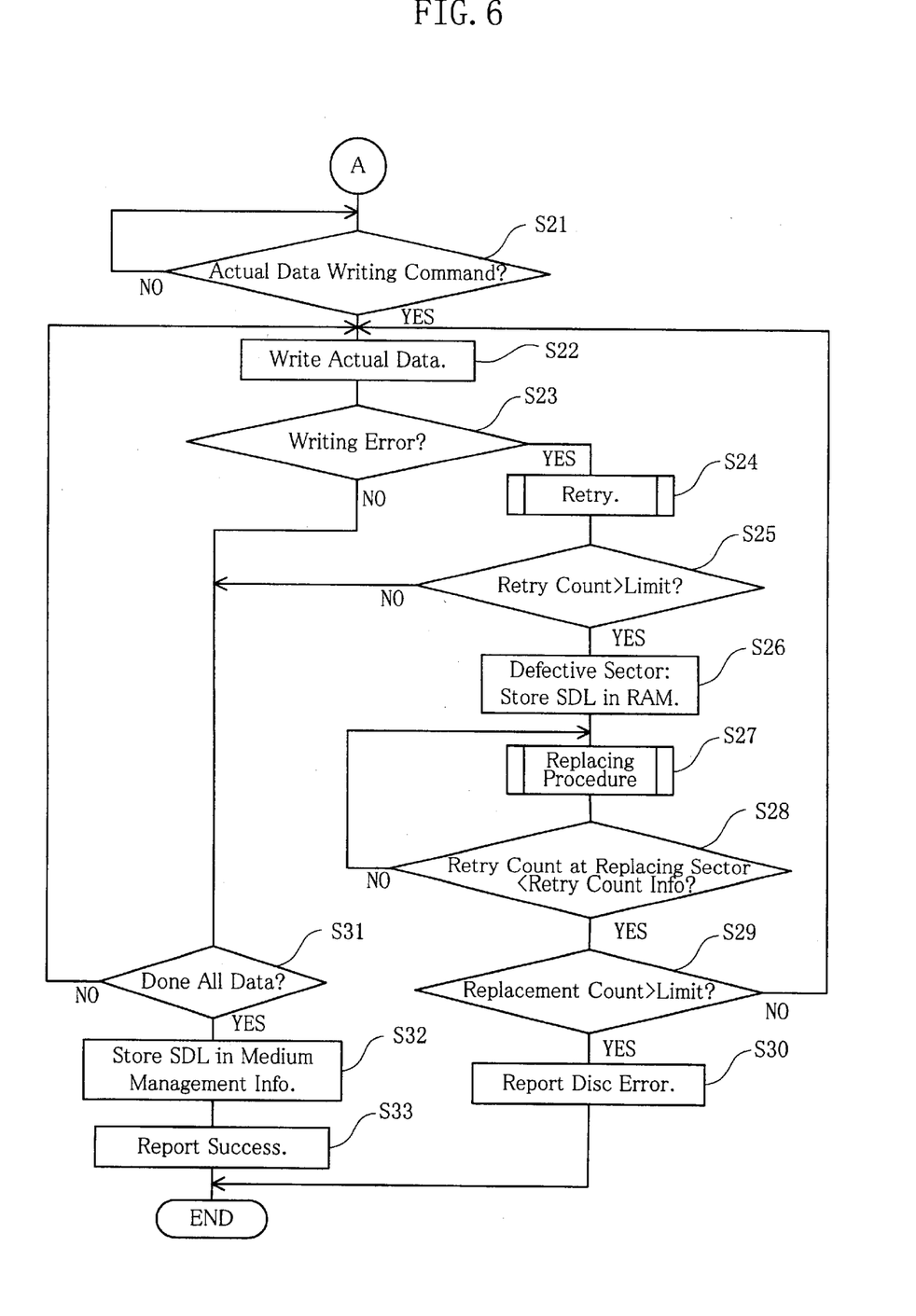
FIG. 6 is a continuation of the flowchart shown in FIG. 5

According to the second embodiment, as shown in the flowchart given in FIG. 5 and continuing to FIG. 6, the formatting procedure is followed by the actual-data writing procedure. This covers a case, for example, in which a personal computer C sends a physical formatting request and then an actual-data writing request right after the formatting is completed, without unloading a magneto-optical disc B.

A major difference from the first embodiment is that after a PDL is stored in the medium management information B1 of the magneto-optical disc B in step S18, the CPU 11 makes the RAM 12 keep the retry count information (S40), i.e. a retry count value for each restored sector which is already stored in the RAM 12, and does not copy the retry count information onto the medium management information B1 of the magneto-optical disc B. The retry count information in the RAM 12 is maintained until the magneto-optical disc B is discharged from the recorder/player A, or until a new magneto-optical disc is loaded in the recorder/player A, or otherwise until power to the recorder/player A is turned off.

It should be noted that in step S18 PDL is copied onto the medium management information B1 of the magneto-optical disc B, and this PDL is also maintained in the RAM 12.

With the above arrangement in which the retry count information and the PDL are maintained in the RAM 12, the CPU advances the process to step S21. In the case of "S21: YES", a command sent from the personal computer C for requesting actual-data writing may not necessarily arrive after the physical formatting is complete, but may accompany a command requesting the physical formatting.

Thus, according to the second embodiment, actual-data writing can be performed right after the physical formatting, and as quickly to the extent that the retry count information is not recorded onto the magneto-optical disc B.

Figure 7:
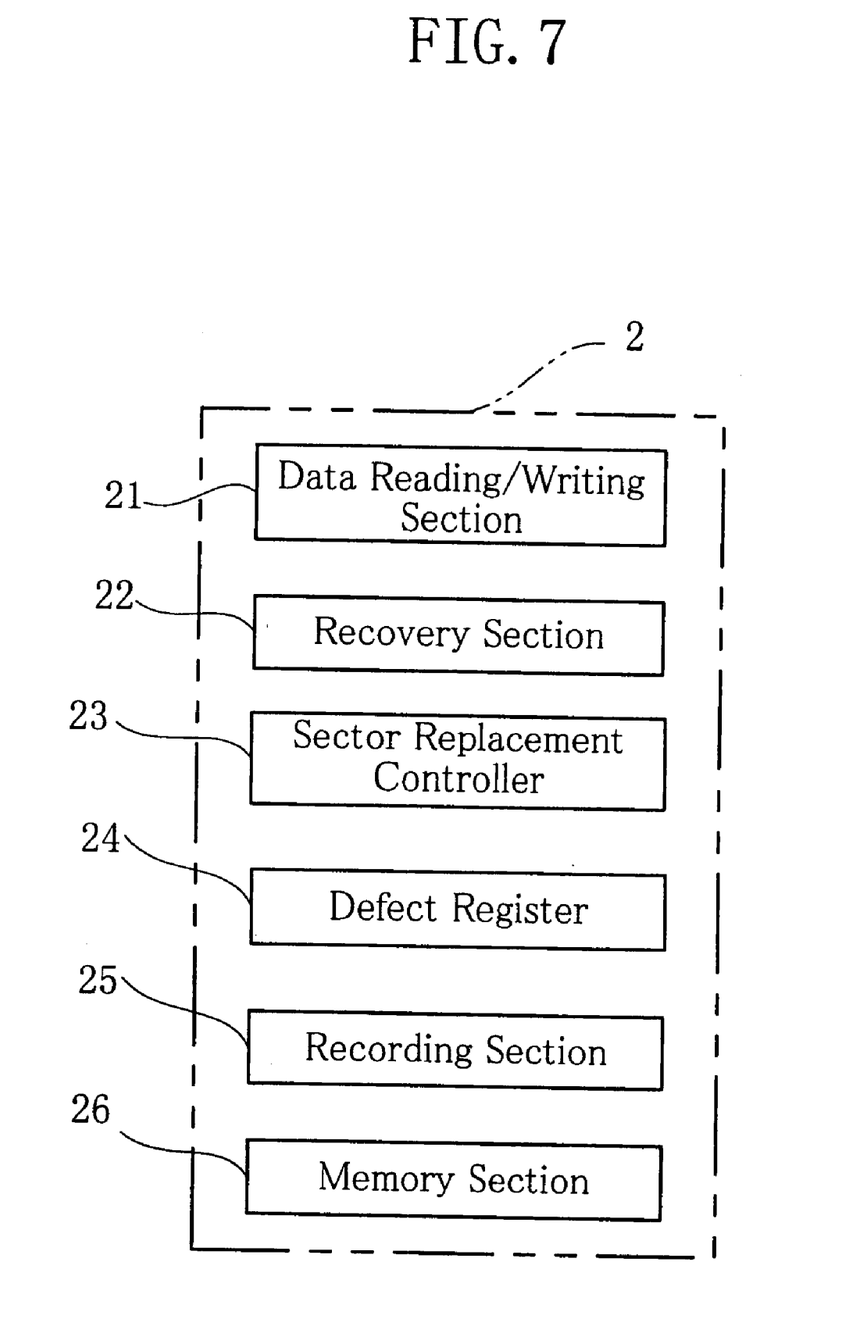
FIG. 7 is a functional block diagram of the recorder/player according to a third embodiment of the present invention.

Next, a third embodiment will be described with reference to FIG. 1, FIG. 7 and FIG. 8. Note that flowchart given in FIG. 7 contains the same steps as in FIG. 4. These steps will be identified by the same step numbers and not be described again.

According to the third embodiment, writing of actual data is accomplished through an operation which is slightly different from the operation in the first embodiment. In order to achieve the new operation, as shown in FIG. 7, the controller 2 further includes a defect register 24.

The defect register 24 is realized by the CPU 11, and performs as follows: During the steps of detecting a defective sector and then finding a replacement sector, if a candidate sector is found to have a retry count value greater than a retry count value recorded for the defective sector, the candidate sector is also registered in the RAM 12 as a defective sector.

Figure 8:
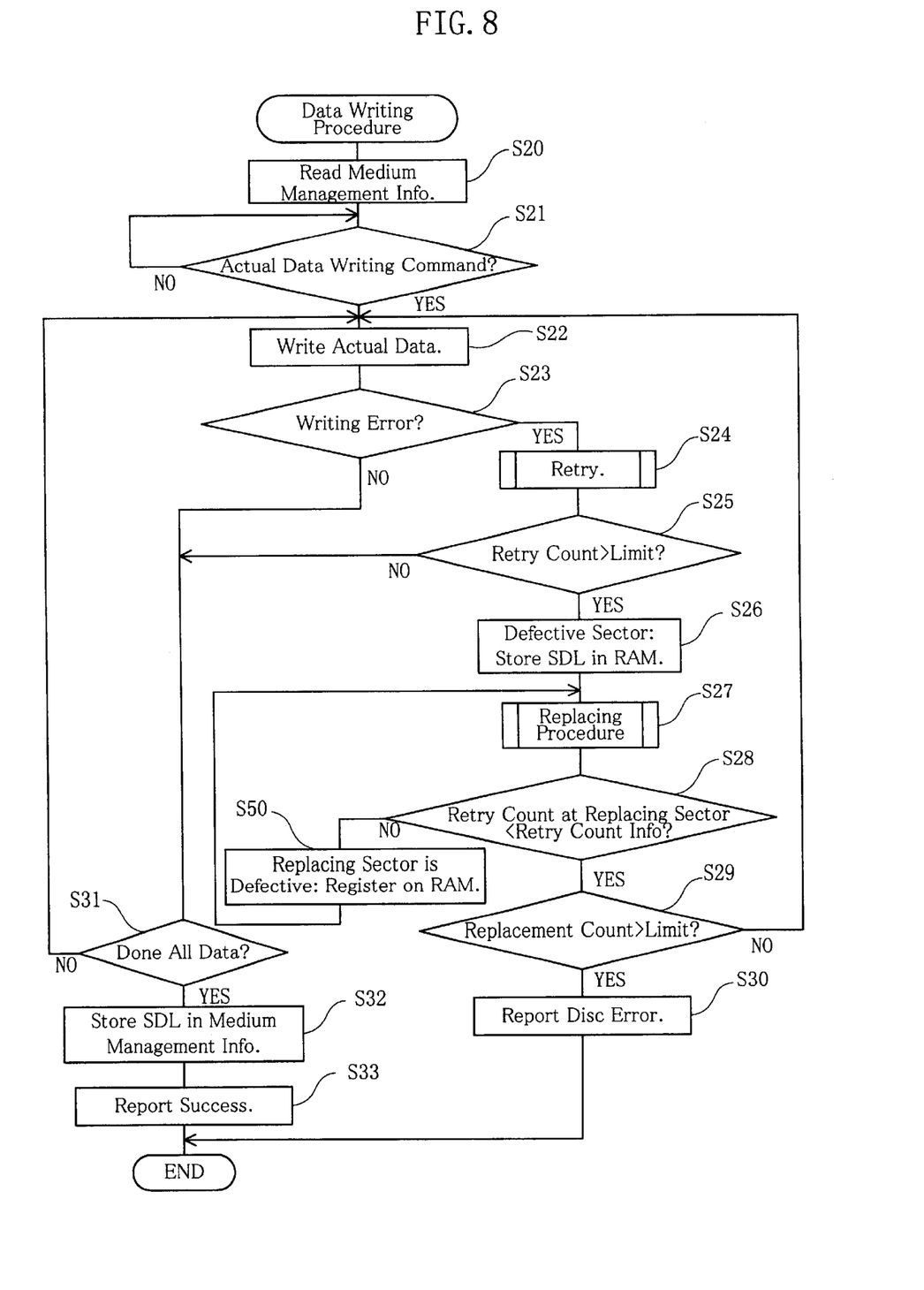
FIG. 8 is a flowchart showing a data writing procedure according to the third embodiment.

Specifically, as shown in FIG. 8, when step S28 determines that the candidate replacement sector will require more retries than the number of retries recorded for the defective sector in the retry count information (S28: NO), the CPU 11 determines that the candidate sector is a defective sector, and registers its address in the RAM 12 (S50).

Thereafter, the CPU 11 brings the process back to S27, trying to find another candidate for the replacement sector. In other words, when a candidate replacement sector is expected to require a greater number of retries than the number of retries recorded for the defective sector in the retry count information, the CPU 11 treats the candidate sector as a defective sector, so that the candidate sector will no longer be used. The address of the defective sector thus obtained is recorded in the form of SDL in the medium management information B1 of the magneto-optical disc B together with the address of the defective sector obtained in step S26. Alternatively however, the address of the defective sector obtained on the basis of the retry count information may be recorded separately from the SDL.

Therefore, according to the third embodiment, those defective sectors detected on the basis of the retry count information during the actual-data writing are no longer used for writing in the future, and to this extent it is possible to cut down on the time spent for unnecessary retry procedures, and to perform the actual-data writing quickly.

Figure 9:
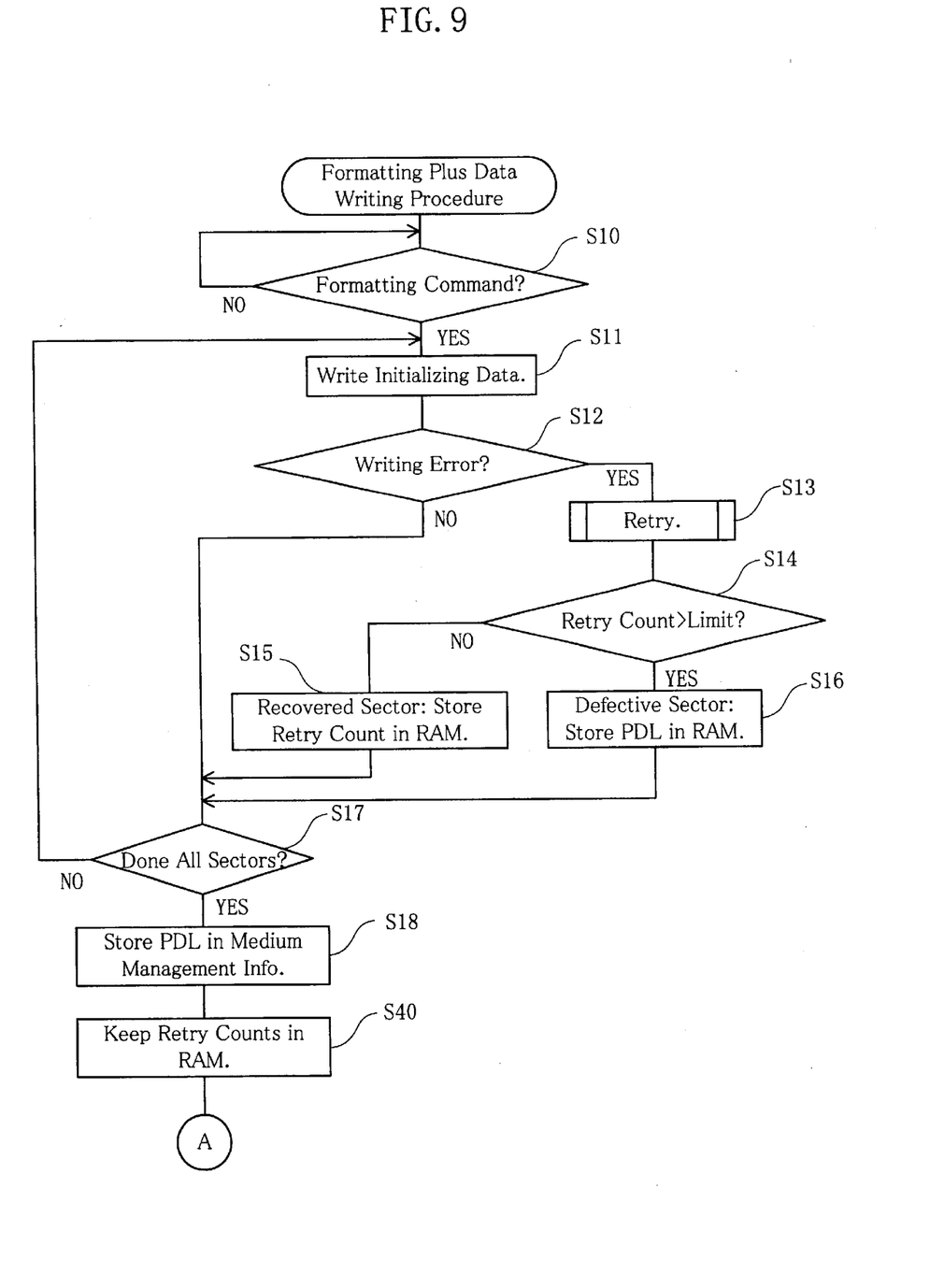
FIG. 9 is a flowchart according to a fourth embodiment, showing a case in which a formatting procedure is followed by a data writing procedure.
Figure 10:
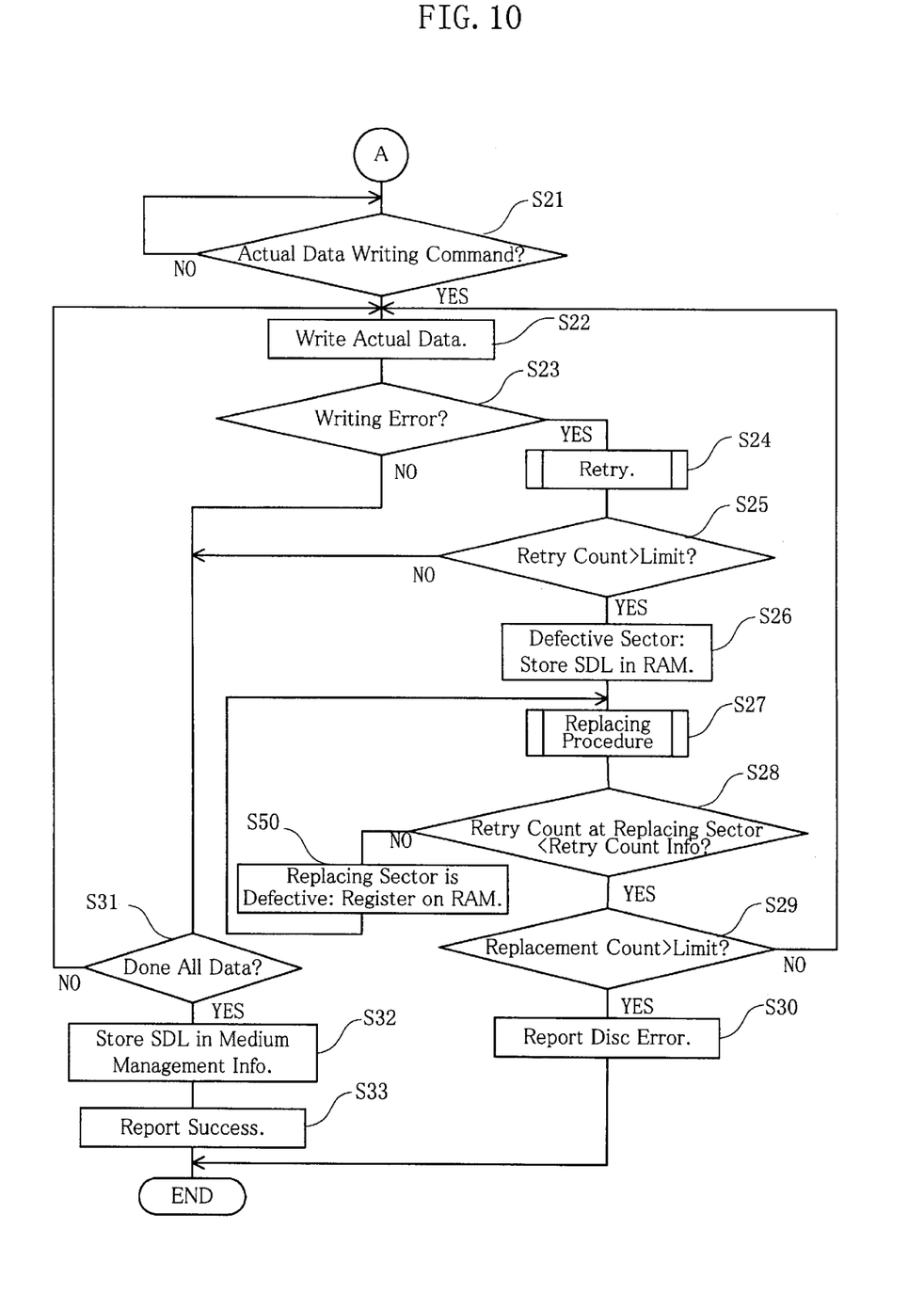
FIG. 10 is a continuation of the flowchart shown in FIG. 9

Next, a fourth embodiment is shown in flowcharts in FIG. 9, and FIG. 10. The fourth embodiments can be regarded as a variation achieved by applying the third embodiment to the second embodiment. Thus, the flowchart in FIG. 10 contains the same steps as in FIG. 6 and FIG. 8. These steps will be identified by the same step numbers and no further description will be given for this embodiment.

It should be noted here that the present invention is not limited to the embodiments described above.

For example, the recording disc may not be limited to the MO, but can include MDs and a variety of iD-format type magneto-optical discs. Further, the present invention is applicable to other kinds of discs such as optical discs of the phase-change type, write-once type and so on, including for example DVDs and CD-ROMs, as well as to magnetic discs such as hard discs and floppy discs.

Another note to be made is that according to the second and the fourth embodiments the retry count information is not recorded on the magneto-optical disc B. However, this does not mean that the retry count information should not be recorded. Thus, the retry count information may be recorded on the magneto-optical disc B e.g. right after the completion of physical formatting or actual-data writing.

Still further, the RAM 12 may keep the retry count information even after the magneto-optical disc B is replaced by another magneto-optical disc, so that the retry count information for the former magneto-optical disc B can be available from the RAM 12 when this former magneto-optical disc B is loaded again.

What is claimed is:

1. A disc recording apparatus for writing data onto a sector providing a recording area on a recording disc, performing a retry upon failure in the writing until a predetermined number of retries is reached, treating the sector as a defective sector upon failure in the last retry of the predetermined number of retries, and writing the data onto another sector, comprising:

a recording section recording onto the recording disc a retry count as retry count information for each of recovered sectors recovered from the failure through success in the writing of data during the retry; and a sector replacing section selecting a replacement sector for the defective sector detected upon the failure in the writing onto the recording disc containing the retry count information recorded by the recording section, the replacement sector having a retry count stored as the retry count information smaller than that of the defective sector.

2. A disc recording apparatus for writing data onto a sector providing a recording area on a recording disc, performing a retry upon failure in the writing until a predetermined number of retries is reached, treating the sector as a defective sector upon failure in the last retry of the predetermined number of retries, and writing the data to another sector, comprising:

a storing section storing a retry count as retry count information for each of recovered sectors recovered from the failure through success in the writing of data during the retry; and a sector replacing section selecting a replacement sector for the defective sector detected upon the failure in the writing onto the recording disc for which the retry count information is stored by the storing section, the replacement sector having a retry count stored as the retry count information smaller than that of the defective sector.

3. The disc recording apparatus according to claim 1, wherein the sector replacing section registers a sector as a defective sector onto the recording disc if the sector is found to have a retry count stored as the retry count information larger than that of the defective sector during the process of selecting the replacement sector.

4. The disc recording apparatus according to claim 2, wherein the sector replacing section registers a sector as a defective sector onto the recording disc if the sector is found to have a retry count stored as the retry count information larger than that of the defective sector during the process of selecting the replacement sector.

5. A method for replacing a sector for writing data onto a sector providing a recording area on a recording disc, performing a retry upon failure in the writing until a predetermined number of retries is reached, treating the sector as a defective sector upon failure in the last retry of the predetermined number of retries, and writing the data onto another sector, comprising:

a step of recording onto the recording disc a retry count as retry count information for each of recovered sectors recovered from the failure through success in the writing of data during the retry; and a step of sector replacing control for selecting a replacement sector for the defective sector detected upon the failure in the writing onto the recording disc containing the retry count information recorded by the recording step, the replacement sector having a retry count stored as the retry count information smaller than that of the defective sector.

6. A method for replacing a sector for writing data onto a sector providing a recording area on a recording disc, performing a retry upon failure in the writing until a predetermined number of retries is reached, treating the sector as a defective sector upon failure in the last retry of the predetermined number of retries, and writing the data to another sector, comprising:

a step of storing a retry count as retry count information for each of recovered sectors recovered from the failure through success in the writing of data during the retry; and a step of sector replacement control for selecting a replacement sector for the defective sector detected upon the failure in the writing onto the recording disc for which the retry count information is stored by the storing step, the replacement sector having a retry count stored as the retry count information smaller than that of the defective sector.

* * * * *